United States Patent [19]

Clonch

[11] E Patent Number: Re. 31,818

[45] Reissued Date of Patent: Jan. 29, 1985

[54] FEEDER CRUSHER

[75] Inventor: David Clonch, Bristol, Va.

[73] Assignee: S & S Corporation, Cedar Bluff, Va.

[21] Appl. No.: 44,266

[22] Filed: May 31, 1979

Related U.S. Patent Documents

Reissue of:

[64] Patent No.: 4,073,445
Issued: Feb. 14, 1978
Appl. No.: 746,819
Filed: Dec. 1, 1976

[51] Int. Cl.[3] ..... B02C 13/30

[52] U.S. Cl. ..... 241/101.7; 241/186 R; 74/751

[58] Field of Search ..... 241/101.7, 186 R, 185 R, 241/189 R; 74/750 R, 751, 572

[56] References Cited

U.S. PATENT DOCUMENTS

| | | | |
|---|---|---|---|
| 2,523,619 | 8/1950 | Grebb | 74/793 X |
| 2,881,642 | 4/1959 | Dodge | 74/751 |
| 3,051,021 | 8/1962 | Miller | 74/751 |
| 3,123,312 | 3/1964 | Palyi | 241/183 R X |
| 3,486,704 | 12/1969 | Persky | 241/186 R X |
| 3,490,705 | 1/1970 | Ruckstahl | 241/186 R X |
| 3,540,308 | 11/1970 | Preston | 74/751 |
| 3,771,311 | 11/1973 | Herbst | 74/751 X |
| 3,899,941 | 8/1975 | Cook | 74/751 X |
| 3,983,950 | 10/1976 | Fabian | 241/101.7 X |

*Primary Examiner*—Robert P. Olszewski
*Attorney, Agent, or Firm*—R. J. Falkowski

[57] ABSTRACT

A mobile, low-profile feeder-crusher machine for receiving, crushing and feeding freshly mined coal to a stationary conveyor system includes a rigid frame supporting a rotary crusher shaft and supporting an endless conveyor for delivering coal to the crusher shaft and for removing crushed coal therefrom. The drive system for the crusher shaft is mounted on the frame and includes a hydraulic pump driven by an electric motor, a hydraulic motor driven by the pump, a planetary gear reduction driven by the hydraulic motor and having a carrier output driving the crusher shaft, and a flywheel rotatable with the input of the reduction gear assembly.

18 Claims, 4 Drawing Figures

FEEDER CRUSHER

Matter enclosed in heavy brackets [ ] appears in the original patent but forms no part of this reissue specification; matter printed in italics indicates the additions made by reissue.

*In accordance with the provisions of 35 U.S.C. 120 the benefit of the filing date is claimed of patent application Ser. No. 746,819, Feeder-Crusher, Filed Dec. 1, 1976, now U.S. Pat. No. 4,073,445, the original of this reissue application, through its copending continuation application, Feeder Crusher, Ser. No. 860,735, Filed Dec. 13, 1977 now abandoned.*

This invention relates to [low-profile feeder] crushers for use in [low-clearance coal] mines and in particular to *feeder-crushers having* improvements in the drive system for rotating the crusher shaft [so as to obtain more effective crushing without adding any appreciable weight or height to the machine].

BACKGROUND OF THE INVENTION

In coal mines where the coal exists in the form of relatively thin layers or seams it has long been the practice to employ coal-handling equipment which has a sufficiently low profile or height to be accommodated in the low-clearance areas formed as the coal is mined. One widely used mining technique includes the use of so-called feeder-crusher machines which [rereceive] *receive* freshly mined coal from a mining machine or haulage vehicle, crush the coal to a smaller more manageable size and feed it to a conveying system for removal from the mine.

Current feeder-crushers are mobile low-profile machines having a horizontally elongated hopper-like body fitted intermediate its ends with a rotary crusher. Horizontal transverse flights carried by a pair of endless chains continuously move along the floor of the body and in so doing they urge coal from the receiving end of the body to the rotary crusher and move the resulting crushed coal away from the crusher toward the rear end of the body where it is discharged. The discharged coal falls on to an endless conveyor which may be one of a series leading out of the mine. A typical feeder-crusher will not exceed about four feet in height in order that it can be maneuvered into a low-clearance space.

The body and the rotary crusher are interconnected with rigid frame members to form a unitary structure which supports the components of the power system required for operation of the machine. Typically, the entire structure is supported on a crawler-type propelling unit operated by a hydraulic or in some cases electric motor. Typically the power system includes an electric motor and a hydraulic pump driven by the motor. Electric current is supplied to the motor by cables leading into the mine. The pump supplies pressurized hydraulic fluid for operating the crawler unit and for operating a separate hydraulic motor which drives a speed reduction unit having its output connected to the rotary crusher shaft.

The rotary crusher is typically of the hammer mill or impact type in which a horizontal rotating shaft is provided along its length with a plurality of radial striker arms or hammers. The shaft is disposed transversely of the body of the machine, and as the coal is urged into the hammer circle between the shaft and the floor of the machine, by means of the moving flights, it is struck and crushed by the striker arms. The coal passes through the hammer circle only once, so that the arms are continually acting on fresh coal.

Since all of the material received by a feeder-crusher passes through the crushing assembly, the crushing of the coal must be carried out continuously and at a high rate if the machine is to operate effectively. The crusher is the limiting feature of the machine, because the conveyor system can be constructed to handle essentially any input load. Therefore, any increase in the ability of the crusher to handle a greater throughput increases the capacity of the machine. In addition it is important to reduce down-time due to jamming of the crusher or breakage of any part of the crusher drive system. Inherently the coal will include rock in varying amounts and the rock being harder and more resistant to crushing will sometimes tend to wedge between the floor of the machine and the breaker arms or will create very high strains in the drive system. The result can be jamming of the crusher and/or shearing of a shear pin which is typically inserted between the crusher shaft and the output shaft of the drive system. The machine is then out of operation until the fault has been remedied, and during this time loading of coal into the receiving end of the machine must stop, thereby reducing production.

The solution of the problems relating to increasing the throughput of a crusher system in a feeder-crusher and to reducing down-time resulting from jamming or breakage do not lie merely in increasing the size and power of the crusher system. The principal reason for this is that it is not practical or economical to install heavier and larger drive components and/or heavier and larger crusher shafts. As previously noted the height of the machine [must] *should* be limited to about four feet; current construction techniques and the power requirements of the machines result in essentially all useable space being occupied. Further, the length, width and weight of the machines are limited as a result of the limited space in which the machines must operate.

SUMMARY OF THE INVENTION

The broad object of the invention is to improve the performance of a rotary impact type crusher, in terms of the ability of the crusher to process material at a greater rate and in terms of reduced jamming, without adding any appreciable size, weight of expense to the system. [It is apparent from the nature] *The performance* of an impact type crusher [that its performance] can be improved by increasing the torque [delivered by] *available at* the crusher shaft [, but the most straightforward means for doing this, that is, replacing the] *by using a* motor [with one] of greater power, [lies outside the constraints of the stated object. It is known, also, that connecting a flywheel to a rotating shaft will effect high torque, and it is conventional in a number of environments to provide] *or* a flywheel [on the work shaft of a machine, that is,] on the relatively low speed output of whatever speed reduction system is driven by the power source.

[In the case of a feeder-crusher machine for use in low clearance mines this modification is not] *Such modifications are not usually* feasible. [because calculations readily show that in order] *For example,* to increase the torque significantly a flywheel connected with the crusher shaft must be extremely large and heavy. [For example, calculations] *Calculations* for a typical crusher shaft rotating at 90 rpm show that to effect a 100% increase in torque a flywheel 10 feet in diameter and weighing 2100 pounds is required.

The present invention [is based primarily on providing] *provides* a flywheel [on] *attached to* the input of the speed reduction system and [secondarily on the selection of] *a suitable speed reducing system having a rigid transmission characteristic, such as* a planetary gear system [as the speed reduction system]. [By connecting] *Because of the higher speed of rotation of* a flywheel [to rotate with] *on* the input of the speed reduction system [, that is, to rotate at high rotational speed relative to the more slowly rotating crusher shaft] *and the resulting exponential increase in stored energy* it is possible to achieve a significant increase in the torque [of] *available to* the crusher shaft with a flywheel of [small] *much smaller* size and mass. For example, to achieve the aforementioned 100% increase in *available* torque a flywheel connected to the input shaft of the speed reduction system at the stated crusher shaft speed of 90 rpm need by only 20 inches in diameter and weigh only 228 pounds [, assuming] *with* an input speed of 675 rpm. This increased *available* torque [has an exceptional ability to increase] *increases* the throughput of the crusher and [to reduce] *reduces* the tendency to jam. The crushing action of the arms or hammers on the coal and rock results from a combination of direct impact of the crusher arms with chunks of material and pinching of the chunks between the bottom of the body of the machine and the crusher arms. Since the proportion of rock and the size of the rock and coal in the material passing to the crusher vary continuously, there is a continuous variation in the stresses applied to the crusher shaft. Further, large chunks cannot pass through the crusher until they have been reduced in size, and as a consequence if a chunk does not break it will jam the crusher, causing damage to the latter or shearing of the shear pin. If the impact and pinching forces can be increased essentially instantaneously with increases in resistance to crushing then the crusher shaft will be much less apt to jam. This is [precisely] the effect [which is] produced by [increasing the torque on the crusher shaft by means of] *the relatively* low-mass, rapidly rotating flywheel arrangement of the present invention.

The [increased torque produced by the] flywheel arrangement of the present invention may, however, create a problem in that the torque is applied through the *rigid* speed reducer [,] rather than directly to the massive crusher shaft. [It has been established by calculation that the increased] *The* torque [supplied by] *available with* the previously described 228 pound flywheel connected to the input of the typical gear type speed reducer in current use on feeder-crusher machines [will] *can* overstress the gears to the point of destruction during use. [The solution to this] *This* problem [does not lie in replacing the existing reducer with] *may be solveable by using* a more massive [one] *speed reducer* of the same design, [because this is inconsistent with the requirement of the invention that the] *but this would prohibitively increase the* weight and size of the overall feeder-crusher machine [must not be increased to any appreciable extent] *and its resulting cost.* [Rather, the problem is solved by replacing the typical speed reducer with] *With this invention* a planetary gear reducer *readily* capable of withstanding the additional torque [. This replacement does not result in] *is used without creating* an increase in size or weight of the overall machine. [because the planetary system has a high strength to weight ratio. This aspect of a] *A* planetary system [is exceedingly well] *may be particularly* adapted for the purpose of the invention [because] *by transmitting* the stresses [applied to] *of* the system [can be readily tranmitted] to the already massive frame of the machine. In using a planetary system in a speed-reducing mode the ring gear is locked [,] *by connecting* the input [is connected] to the sun gear and the output [is connected] to the carrier[. In the system contemplated by the present invention] *and locking* the ring gear [need not ever rotate and] *which* may therefore be *made* a permanent part of the frame. While a simple planetary system will suffice a compound system may also be employed.

DETAILED DESCRIPTION OF EXEMPLARY EMBODIMENT

The invention will be further understood from the following more detailed description taken with the drawings in which.

Figure 2:
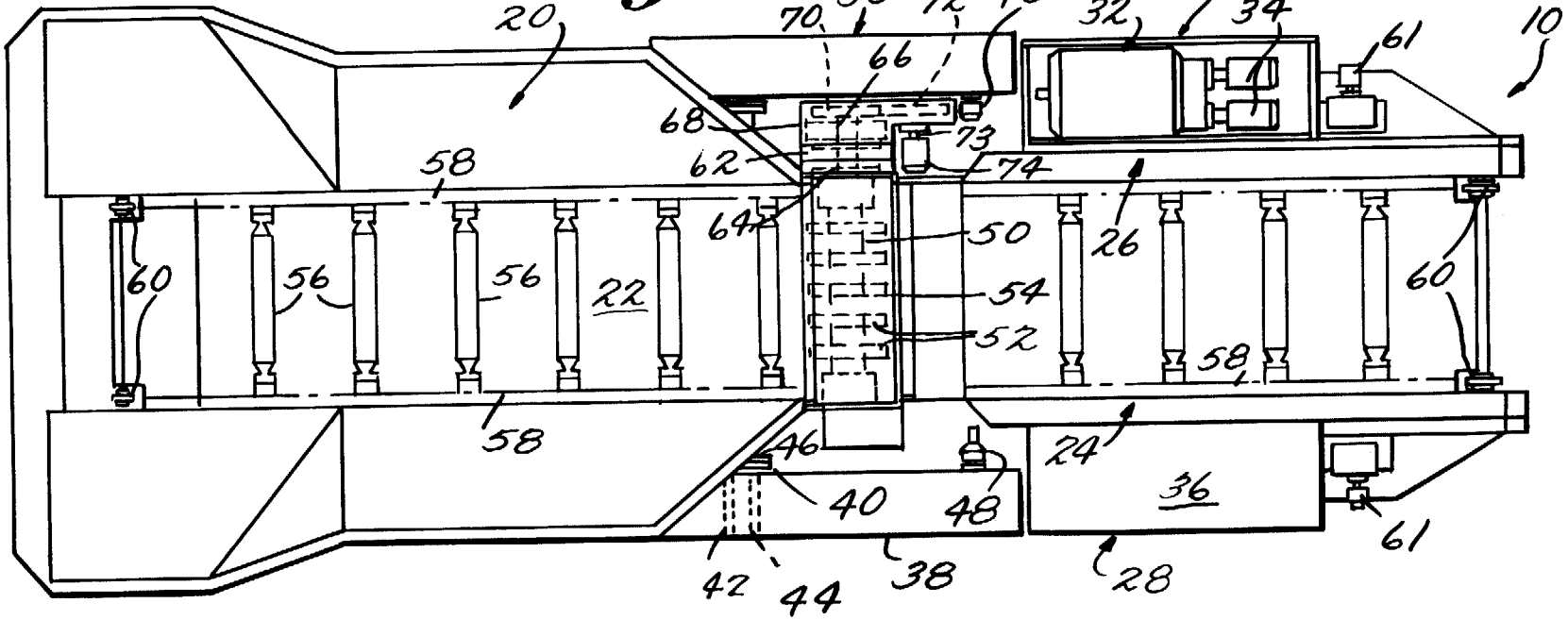
FIG. 2 is a schematic plan view of the machine of FIG. 1.
Figure 1:
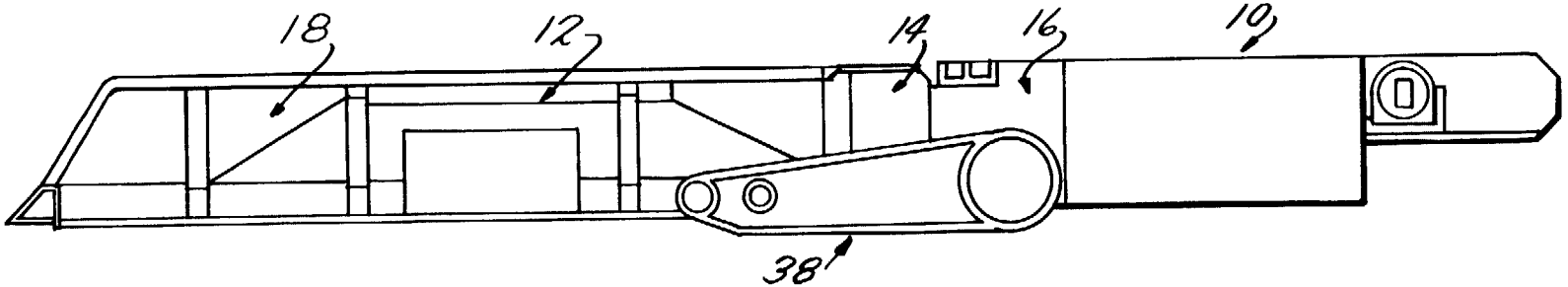
FIG. 1 is a schematic elevational view of a feeder-crusher machine.
Figure 4:
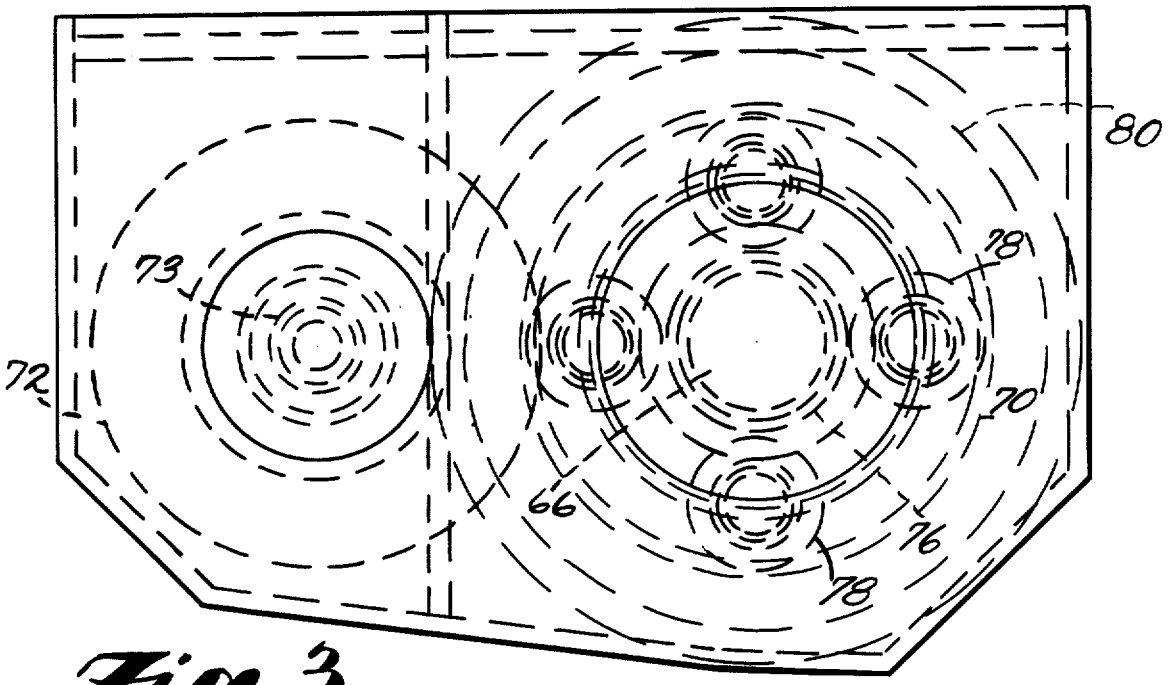
FIG. 4 is an end view of the drive system for the crusher.

FIGS. 1 and 2 illustrate a feeder-crusher machine 10 which includes [as its major parts] a receiving section 12, a crusher section 14 and a discharge section 16. The receiving section 12 is a hopper-like structure open at both ends and at the top and [being] formed [of] *by* side walls 18 and 20 and a bottom wall 22, the latter extending the length of the machine and thereby forming the bottom wall of the crusher section 14 and of the discharge section 16. The discharge section 16 includes side walls 24 and 26 and lateral support shelves 28 and 30 for supporting the components of the power system, such as an electric motor 32, hydraulic pumps 34 and a reservoir 36 for the hydraulic system. In the interest of simplicity the connections between the pumps 34, the various hydraulic motors and the reservoir 36 are not shown.

The three sections 12, 14 and 16 together with various frame members form a unitary rigid body which is supported from the ground by two transversely-spaced endless-thread crawler units 38. The connection between each crawler unit 38 and the body is a tube and shaft-like assembly 40 having a tubular end 42 which is fixed to the frame of the unit 38 and a shaft end 44 which is bolt-connected to the body at 46 for limited rotation about a transverse horizontal axis. A hydraulic piston and cylinder unit (not shown) connected between the body and the frame of the crawler unit determines the angular position of the body relative to the crawler units 38. The drive system for each crawler unit 38 includes a hydraulic motor 48 which receives pressure fluid from one of the pumps 34.

The crusher section 14 includes a rigid horizontal shaft 50 mounted transversely in the machine and provided with a plurality of radial breaker arms 42 or hammers. The circle 54 defined by the outer ends of the arms 52 during rotation of the shaft 50 lies slightly above the bottom wall 22 of the machine so that coal and rock will be crushed in passing through the space between the circle 54 and the wall 22. During operation of the machine coal and rock are urged into this space by a series of longitudinally spaced apart transverse flights 56 which are moved from left to right along the upper surface of the bottom wall 22 by [means of] a pair of spaced-apart endless chains the upper run of which is illustrated at 58. The chains 58 are looped over sprockets 60 and are driven by hydraulic motors 61 powered from one of the pumps 34. The crushed material is then carried by the flights 56 from the crusher section 14 to the right hand end of the machine.

All of the above is generally conventional in feeder-crusher machines. [According to the present invention the] *The* drive system for the crusher shaft 50 includes a planetary gear reduction unit 62 having a low speed output driving the crusher shaft 50 and having a high speed input carrying a flywheel 68. The input shaft 66 also carries a secondary input gear 70 which meshes with a primary input gear 72 carried by the shaft 73 of a hydraulic motor 74 driven by one of the pumps 34.

Figure 3:
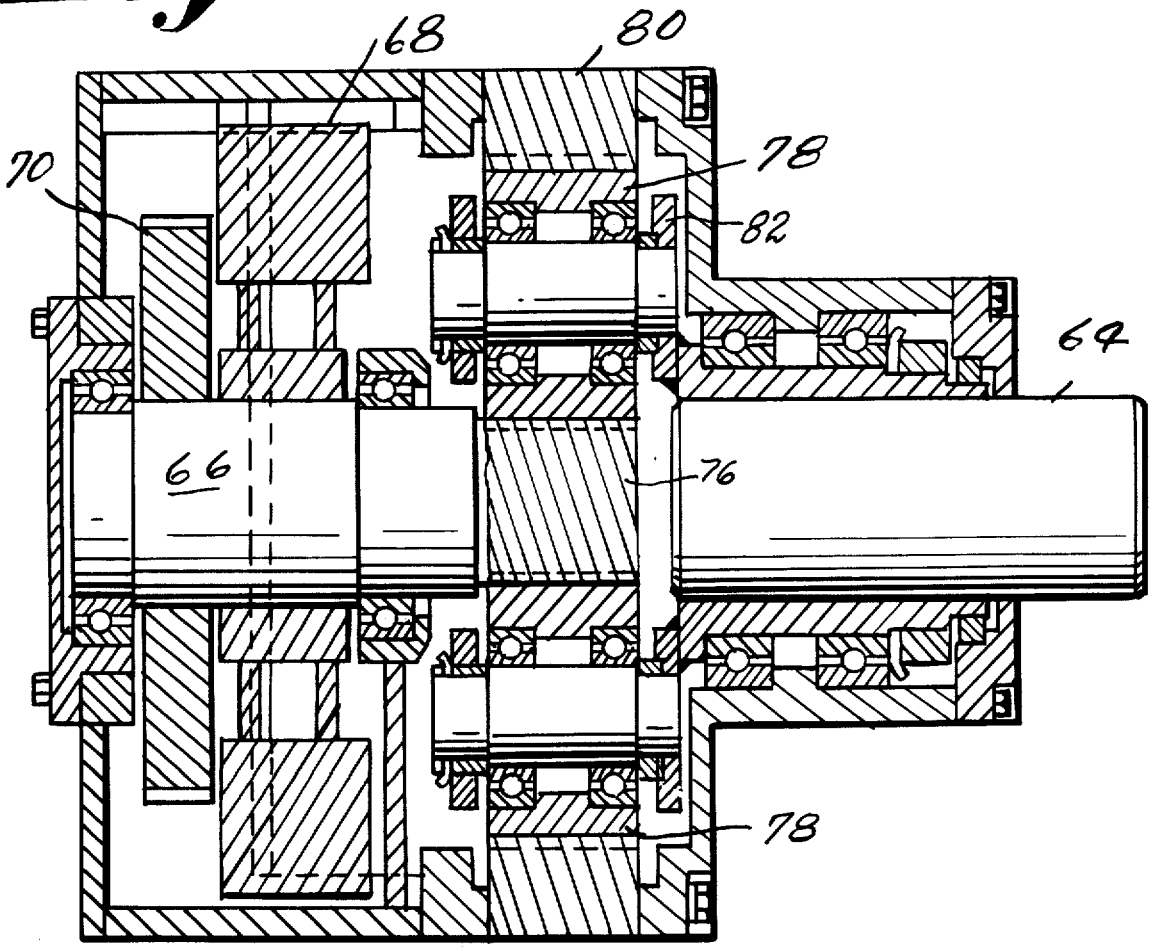
FIG. 3 is a sectional view on an enlarged scale of the drive system for the crusher.

As seen in FIG. 3 the planetary gear unit 62 includes a sun gear 76 carried on the input shaft 66 and four planet gears 78 meshing with the sun gear 76 and with an internally toothed ring gear 80. An end 64 of the crusher shaft 50 is carried by a planet gear carrier 82. The ring gear 80 is fixed against rotation, preferably by being made unitary with the body and/or frame of the machine.

In use the machine is propelled into a [low clearance] mine area by means of the crawler units 38, under the control of an operator. Electric current for the motor 32 is supplied to the machine by a cable (not shown). The control valves for the various hydraulic motors are carried by the machine but are not shown inasmuch as they [may be] *are* conventional features of a feeder-crusher. When the machine has been properly located, the sprocket motors 61 and the crusher motor 74 are set in motion and coal is loaded into the receiving section 14. The moving flights 56 urge the uncrushed coal into the hammer circle 54 of the crusher and then urge the coal crushed by the breaker arms 52 into the discharge section 16.

The system of flights 56 and chains 58 can be designed and constructed to transport the uncrushed and crushed coal at essentially any practical rate and the ability of the crusher is therefore the limiting feature of the machine's throughput. As described earlier [this limiting feature is overcome to a large extent by providing] *by connecting* a flywheel 68 [at] *to* the high-speed input *shaft* of the speed reducer [so that the] torque [applied] *available* to the crusher shaft 50 is [amplified by the rapidly rotating] *significantly increased for a given* flywheel [68]. The [amplification] *increase* is, of course, [proportional to] *a function of* the weight *of* and *the square of the* speed of *rotation of* the flywheel 68, and for a given crusher the weight of the flywheel to be used will be selected on the basis of the desired [increase in] torque, subject to the space available for the flywheel, *the speed of rotation of the input* and the ability of the crusher to withstand [higher] stresses. Preferably the flywheel should produce a minimum increase of 25% in the torque [applied to] *available at* the crusher shaft [,] over that [which is] available without the flywheel. The speed reducer is preferably of the planetary gear type because this type of construction is capable of absorbing the high stresses which will develop [when the amplified torque applied to the crusher shaft 50 overcomes a resistance which would cause jamming of the crusher if the amplified torque was not present].

It will be understood that the term flywheel means a discrete body of revolution of greater diameter and mass than the shaft on which it is carried. The flywheel may have its mass concentrated, ring-like, near its periphery as shown, or it may be a disc of uniform thickness.

What is claimed is:

1. A feeder-crusher machine for use in low clearance mines comprising an elongated low-profile body supported from the ground on traction means so as to be movable along the ground longitudinally, said body having side walls and a bottom and including, in end-to-end relationship along the length of the machine, a receiving section, a crushing section and a discharge section; said crushing section including a rotary crusher shaft mounted transversely in said body and carrying a plurality of radial breaker arms the outer ends of which define a circle spaced from a wall of the machine; means for urging material residing on said bottom in said receiving section to the space between said circle and said wall so as to be crushed therein and for urging the resulting crushed material along the discharged section in a direction away from said crusher section; and drive means mounted on said body for rotating said crusher shaft, said drive means including a constant-speedmotor, a mechanical speed reduction unit having a high speed input driven by said motor, a low speed output driving said crusher shaft, a gear system connected between the input and the output for rotating the output at a speed proportional only to the speed of the input and a flywheel connected to rotate with said high speed input to said speed reduction unit whereby amplified torque produced by the high speed flywheel is transmitted through the gear connections in said reduction unit to the more slowly rotating crusher shaft.

2. A feeder-crusher as in claim 1 wherein said speed reduction unit includes a planetary gear set having a sun gear, another gear, planet gears meshing with said sun gear and said other gear and a planet carrier, said other gear being fixed to said body, said sun gear being driven by said motor and said carrier driving said low speed output.

*3. In an impact-type crushing machine: a rotary crusher shaft carrying impact means; fixed means against which material is crushed by the action of the impact means on the material; a high speed motor; a planetary gear reduction unit having a sun gear, another gear, planet gears meshing with said sun gear and with said other gear and a planet carrier; means fixing said other gear against rotation; a first driving connection between said motor and said sun gear, said first driving connection including a flywheel which amplifies the torque supplied through said meshing gears to said crusher shaft.*

*4. A crusher maching having a crusher section; a movable breaker surface within the crusher section; a means for moving material to the crusher section; a rotating power source; and a means for driving the breaker surface from the rotating power source comprising: a rigid speed reduction system having a relatively high rotating speed input connected to be driven by the power source and a relatively low speed output connected to move the breaker surface, and a flywheel attached to rotate with the input whereby the inertial energy of rotation of said flywheel is transmitted through the reduction system to the breaker surface.*

*5. A crusher machine according to claim 4 wherein said machine is a feeder crusher machine.*

*6. A crusher machine according to claim 4 wherein said movable breaker surface is a rotating crusher shaft with breaker arms mounted on said shaft.*

*7. A crusher machine according to claim 4 wherein said speed reduction system comprises a planetary gear unit.*

*8. A crusher machine according to claim 7 wherein said machine has a frame and wherein said planetary gear unit has a ring fixedly attached to same frame.*

*9. A crusher machine having a crusher section; a movable breaker surface within the crusher section; a means for moving material to the crusher section; and a means for driving the breaker surface from a rotating power source comprising: a rigid speed reduction system having a relatively high rotating speed input adapted to be driven by a rotating power source, a relatively low speed output connected to drive the breaker surface, and a flywheel attached to rotate with the input whereby the inertial energy of rotation of said flywheel is transmitted through the reduction unit to the breaker surface.*

*10. A crusher machine according to claim 9 wherein said movable breaker surface is a rotating crusher shaft with breaker arms mounted on said shaft.*

*11. A crusher machine according to claim 9 wherein said speed reduction means comprises a planetary gear unit.*

*12. A crusher machine according to claim 11 wherein said machine has a frame supporting its parts and wherein said planetary gear unit has a ring gear fixedly attached to said frame.*

*13. A crusher machine having a crusher means for crushing material adapted to be driven by a rotating input; a means for moving material to the crusher means; a means for rigidly driving the crusher means at a relatively low rotating speed from a relatively high speed of rotating input: and a flywheel attached to rotate with the input.*

*14. A crusher machine according to claim 13 wherein said machine is a feeder crusher machine.*

*15. A crusher machine according to claim 13 wherein said crusher means comprises a rotating crusher shaft with breaker arms mounted on said shaft.*

*16. A crusher machine according to claim 13 wherein said means for driving comprises a planetary gear unit.*

*17. A crusher machine according to claim 16 wherein said machine has a main support frame and wherein said planetary gear unit has a ring gear fixedly attached to said frame.*

*18. A crusher machine having a crusher shaft, a power means for producing a rotating output, a speed reduction means connected to receive the rotating output for rigidly transmitting said rotating output to the crusher shaft at a reduced speed of rotation, and a flywheel having a selected mass connected to rotate with the rotating output to thereby provide energy.*

* * * * *